Oct. 14, 1947.　　　J. D. McDONALD　　　2,429,067
DYNAMOELECTRIC MACHINE AND DRIVING CONNECTION
Filed Dec. 23, 1944

Inventor:
James D. McDonald,
by Harry E. Dunham
His Attorney.

Patented Oct. 14, 1947

2,429,067

UNITED STATES PATENT OFFICE 2,429,067

DYNAMOELECTRIC MACHINE AND DRIVING CONNECTION

James D. McDonald, Erie, Pa., assignor to General Electric Company, a corporation of New York Application December 23, 1944, Serial No. 569,561

18 Claims. (Cl. 74—440)

My invention relates to dynamoelectric machines and in particular to improved driving connections for the rotatable members of such machines.

An object of my invention is to provide a dynamo-electric machine with an improved mounting for the rotatable member and a driving connection therefor.

Another object of my invention is to provide an improved driving connection preloaded for eliminating backlash between connecting gears.

A further object of my invention is to provide a driving arrangement for eliminating backlash between driving and driven gearing.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
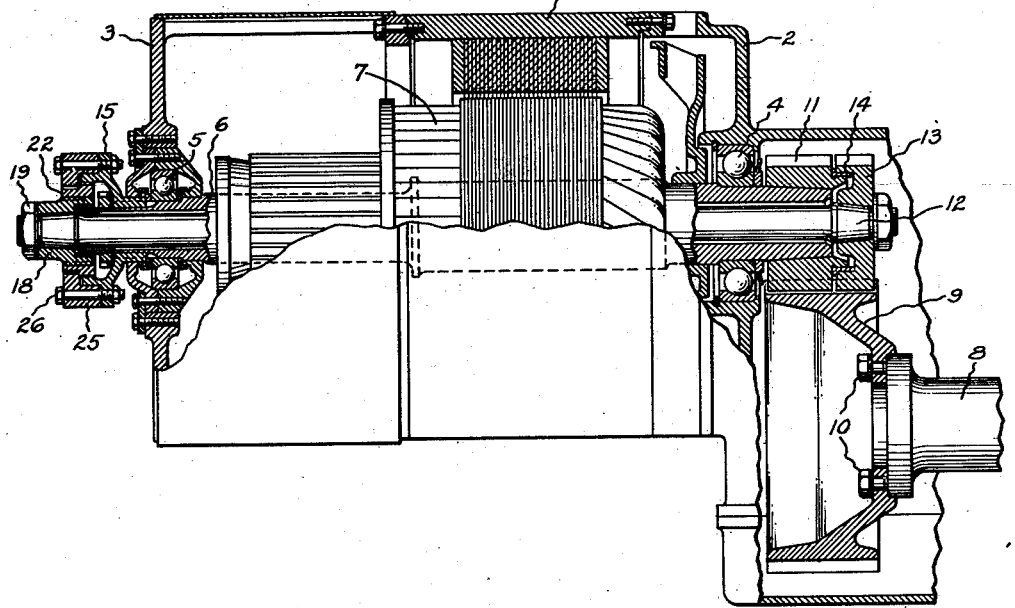
Figure 2:
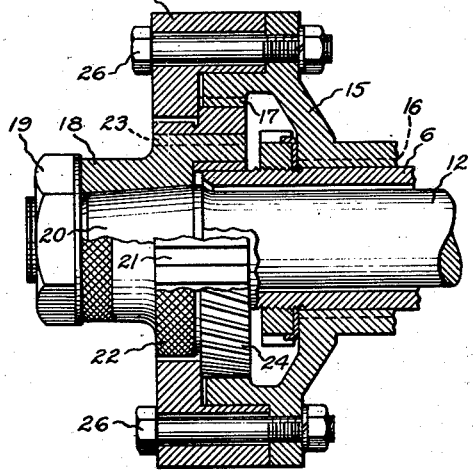
Figure 3:
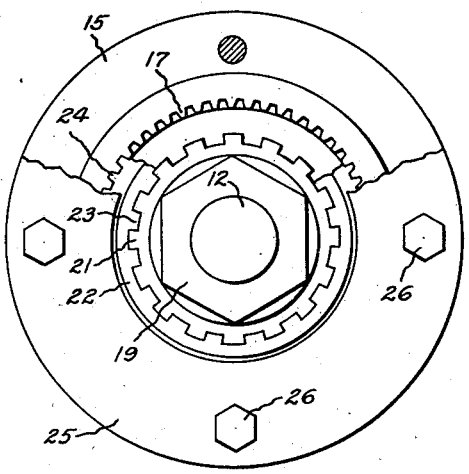

In the drawing, Fig. 1 is a side elevational view, partly broken away, illustrating a dynamoelectric machine provided with an embodiment of my invention; Fig. 2 is an enlarged view, partly broken away, showing the torsional stressing arrangement used in my improved preloading device in Fig. 1; and Fig. 3 is an end view, partly broken away, of the torsional stressing arrangement shown in Fig. 2.

Referring to the drawing, I have shown an embodiment of my invention applied to a dynamoelectric machine provided with a stationary member 1 having end shields 2 and 3 arranged to support bearings 4 and 5 in which a quill shaft 6 is mounted for supporting a rotatable member 7 of the machine. A driving arrangement is provided between the rotatable member 7 and a drive shaft 8 through gearing including a relatively wide gear 9 secured in any suitable manner, as by bolts 10, to the end of the shaft 8. The gear 9 in another form obviously could have internally cut teeth instead of externally cut teeth as shown in Fig. 1, and together with gears 11 and 13 could become an internal-external tooth coupling, in which case the axis of drive shaft 8 would be a continuation of the axis of quill shaft 6. This gear 9 forms an external driving connector with which the quill shaft 6 forms a driving connection through a gear 11 which is secured to the quill shaft in any suitable manner, as by a shrink fit thereon. In order to eliminate backlash between the gears 9 and 11, I provide a preloading arrangement including a torsion rod 12 which is arranged within the quill shaft 6 and provided with a gear 13 which is secured to the torsion rod 12 at the end thereof adjacent the gears 9 and 11 and which is arranged in driving engagement with the gear 9. The end of the torsion rod 12 adjacent the gear 9 is supported on the quill shaft 6 through a bearing 14 on the adjacent end of the quill shaft gear 11. Both the quill shaft gear 11 and the torsion rod gear 13 are arranged in driving engagement with the external connector gear 9 providing a mechanical connection between the quill shaft and the torsion rod through the gears and thereby prevents relative rotation therebetween. The other ends of the quill shaft 6 and the torsion rod 12 are connected together through a preloading device for torsionally stressing the torsion rod 12 to eliminate backlash between the gears 11 and 13 and the connector gear 9. This connection between the quill shaft 6 and the torsion rod 12 includes a flange 15 which is secured to the quill shaft 6 in any suitable manner, as by a spline 16, against relative rotation therebetween and is formed with an internal helical gear 17 thereon. The torsion rod 12 is provided with a flange member 18 secured to the end thereof away from the gears 9, 11, and 13 and adjacent the internal helical gear 17 by a suitable clamping nut 19 and by being shrunk on the tapered end portion 20 of the torsion rod. This flange 18 is formed with an external set of splines 21 thereon, such that the teeth of the helical gear 17 are a multiple of the number of splines in the set of splines 21 plus or minus one tooth of the helical gear. The driving connection between the torsion rod 12 and the quill shaft 6 is provided by a gear toothed coupling sleeve member 22 which is formed with an internal spline 23 thereon complementary to the torsion rod spline 21 and with an external helical gear toothed portion 24 thereon complementary to the quill shaft helical gear 17. In assembling this connection, the coupling sleeve 22 is slipped on to the spline 21 in engagement therewith and a position is selected by trial, such that the ends of the helical teeth of the coupling sleeve 22 just mesh with the end of the teeth of the helical gear 17. Backlash between the gears 11 and 13 and the connector gear 9 is eliminated by pushing the coupling sleeve 22 axially towards the quill shaft flange member 15. The coupling sleeve 22 then is removed and realigned such that the ends of the helical gear teeth 24 thereon again just mesh with the ends of the teeth of the quill shaft helical gear 17. A flange cover 25 is then arranged over the outer side of the coupling sleeve 22 and in engagement with the end of the helical gear formed thereon and over the outer periphery of the helical gear formed on the quill shaft flange member 15. This flange cover 25 is then drawn up by a plurality of bolts 26 so as to move the coupling sleeve member 22 axially towards the quill shaft flange 15, thus axially biasing the coupling sleeve to a position which torsionally stresses the torsion rod 12 by turning the end thereof to which the splined member 18 is secured through the pitch of one of the helical teeth of the helical gear 17 providing a twist in said torsion rod by the helical pitch of the helical gears. By changing the angle of the helix of the helical gears, as well as by changing the face width of the teeth or the number of the teeth, the tensile stress in the bolts, and therefore the amount of torque required to tighten the coupling sleeve 18, can be kept to a practical value. With this construction, no special tools or fixtures are required for assembling or disassembling my improved driving connection, and the preloading device eliminates backlash between the rotatable member 7 and the external connecting gear 9 through the gears 11 and 13.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A driving arrangement including an external driving connector, a quill shaft, means secured to said quill shaft for providing a driving connection between said external driving connector and said quill shaft, means including a torsion rod extending through said quill shaft for preloading said driving connection, means for providing a driving connection between said torsion rod and said external connector, and means spaced axially away from said external connector for torsionally stressing said torsion rod and for providing a driving connection between said torsion rod and said quill shaft.

2. A driving connection including a gear, a quill shaft, means including a second gear arranged in engagement with said first-mentioned gear and secured to said quill shaft for providing a driving connection between said quill shaft and said first mentioned gear, means including a torsion rod extending through said quill shaft and mechanically connected to said quill shaft adjacent said second gear for preloading the gear mesh of said first-mentioned and second gears for eliminating backlash therebetween, and means axially spaced away from said second gear for torsionally stressing said torsion rod and for providing a driving connection between said torsion rod and said quill shaft for twisting said torsion rod.

3. An electric machine including a stationary member and rotatable member having a quill shaft mounted in said stationary member, an external driving connector, means secured to said quill shaft for providing a driving connection between said external driving connector and said quill shaft, means including a torsion rod extending through said quill shaft for preloading said driving connection, means for providing a driving connection between said torsion rod and said external connector, means for supporting said torsion rod on said quill shaft, and means spaced axially away from said external connector for torsionally stressing said torsion rod and for providing a driving connection between said torsion rod and said quill shaft.

4. A driving connection including a gear, a quill shaft, means including a second gear arranged in engagement with said first-mentioned gear and secured to said quill shaft for providing a driving connection therebetween, means including a torsion rod extending through said quill shaft for preloading the gear mesh of said first-mentioned and second gears for eliminating backlash therebetween, said preloading means including a gear toothed member arranged in driving engagement with said first-mentioned gear and secured to said torsion rod, and means axially spaced away from said second gear for torsionally stressing said torsion rod and for providing a driving connection between said torsion rod and said quill shaft for twisting said torsion rod.

5. A driving connection including a gear, a quill shaft, means including a second gear arranged in engagement with said first-mentioned gear and secured to said quill shaft for providing a driving connection therebetween, means including a torsion rod extending through said quill shaft for preloading the gear mesh of said first-mentioned and second gears for eliminating backlash therebetween, said preloading means including a third gear arranged in driving engagement with said first-mentioned gear and secured to said torsion rod, and means including a helical gear on said quill shaft axially spaced from said second gear for torsionally stressing said torsion rod, said torsion stressing means including a spline on said torsion rod adjacent said quill shaft helical gear, a coupling sleeve having a spline thereon complementary to said torsion rod spline and a helical gear toothed portion thereon complementary to said quill shaft helical gear, and means for axially biasing said coupling sleeve to a position with said spline thereon in engagement with said torsion rod spline and said helical gear portion thereon in engagement with said quill shaft helical gear.

6. A driving arrangement including an external driving connector, a quill shaft, means secured to said quill shaft for providing a driving connection between said external driving connector and said quill shaft, means including a torsion rod extending through said quill shaft for preloading said driving connection, said preloading means including means for providing a driving connection between said torsion rod and said external connector, and means including a helical gear secured to said quill shaft axially spaced away from said external driving connector for torsionally stressing said torsion rod, said torsion stressing means including a spline on said torsion rod adjacent said quill shaft helical gear, a coupling sleeve having a spline thereon complementary to said torsion rod spline and a helical gear toothed portion thereon complementary to said quill shaft helical gear, and means for axially biasing said coupling sleeve to a position with said spline thereon in engagement with said torsion rod spline and said helical gear portion thereon in engagement with said quill shaft helical gear for twisting said torsion rod.

7. A driving connection including a gear, a quill shaft, means including a second gear on said quill shaft arranged in engagement with said first-mentioned gear for providing a driving connection therebetween, means including a torsion rod for preloading the gear mesh of said first-mentioned and second gears for eliminating backlash therebetween, said preloading means including a third gear on said torsion rod arranged in driving engagement with said first-mentioned gear, and means including a helical gear on said quill shaft axially spaced away from said second gear for torsionally stressing said torsion rod, said torsion stressing means including a spline on said torsion rod adjacent said quill shaft helical gear, a coupling sleeve having a spline thereon complementary to said torsion rod spline and a helical gear toothed portion thereon complementary to said quill shaft helical gear, and means for axially biasing said coupling sleeve to a position with said spline thereon in engagement with said torsion rod spline and said helical gear portion thereon in engagement with said quill shaft helical gear for twisting said torsion rod.

8. An electric machine including a stationary member and a rotatable member having a quill shaft mounted in said stationary member, an external driving connector, means secured to said quill shaft for providing a driving connection between said external driving connector and said quill shaft, means including a torsion rod for preloading said driving connection, means for providing a driving connection between said torsion rod and said external connector, and means including a flange on said quill shaft spaced axially away from said external connector having a helical gear thereon for torsionally stressing said torsion rod, said torsion stressing means including a spline on the end of said torsion rod adjacent said quill shaft helical gear, a coupling sleeve having a spline thereon complementary to said torsion rod spline and a helical gear toothed portion thereon complementary to said quill shaft helical gear, and means adapted to engage said coupling sleeve for axially biasing said coupling sleeve to a position with said spline thereon in engagement with said torsion rod spline and said helical gear portion thereon in engagement with said quill shaft helical gear.

9. A driving connection including a gear, a quill shaft, means including a second gear arranged in engagement with said first-mentioned gear and secured to said quill shaft for providing a driving connection therebetween, means including a torsion rod extending through said quill shaft for preloading the gear mesh of said first-mentioned and second gears for eliminating backlash therebetween, said preloading means including a third gear arranged in driving engagement with said first-mentioned gear and secured to said torsion rod, means for supporting said torsion rod on said quill shaft, and means including a helical gear secured to said quill shaft adjacent the end thereof away from said second gear for torsionally stressing said torsion rod, said torsion stressing means including a spline on the end of said torsion rod adjacent said quill shaft helical gear, a coupling sleeve having a spline thereon complementary to said torsion rod spline and a helical gear toothed portion thereon complementary to said quill shaft helical gear, and means for biasing said coupling sleeve to a position with said spline thereon in engagement with said torsion rod spline and said helical gear toothed portion thereon in engagement with said quill shaft helical gear.

10. An electric machine including a stationary member and a rotatable member having a quill shaft mounted in said stationary member, an external driving connector, means secured to said quill shaft for providing a driving connection between said external driving connector and said quill shaft, means including a torsion rod extending through said quill shaft for preloading said driving connection, means for providing a driving connection between said torsion rod and said external connector, and means including a flange on said quill shaft adjacent the end thereof away from said external connector having a helical gear thereon for torsionally stressing said torsion rod, said torsion stressing means including a spline on the end of said torsion rod adjacent the end thereof away from said external connector and adjacent said quill shaft helical gear, a coupling sleeve having a spline thereon complementary to said torsion rod spline and a helical gear toothed portion thereon complementary to said quill shaft helical gear, and means adapted to engage said coupling sleeve for axially biasing said coupling sleeve to a position with said spline thereon in engagement with said torsion rod spline and said helical gear toothed portion thereon in engagement with said quill shaft helical gear.

11. A driving connection including a gear, a quill shaft, means including a second gear arranged in engagement with said first-mentioned gear and secured to said quill shaft for providing a driving connection therebetween, means including a torsion rod for preloading the gear mesh of said first-mentioned and second gears for eliminating backlash therebetween, said pre-loading means including a third gear arranged in driving engagement with said first-mentioned gear and secured to said torsion rod, and means including a helical gear on said quill shaft axially spaced from said second gear for torsionally stressing said torsion rod, said torsion stressing means including a spline on said torsion rod adjacent said quill shaft helical gear, a coupling sleeve having a spline thereon complementary to said torsion rod spline and a helical gear toothed portion thereon complementary to said quill shaft helical gear, means including a flanged cover adapted to be secured to said quill shaft flange in engagement with said coupling sleeve for axially biasing said coupling sleeve to a position with said spline thereon in engagement with said torsion rod spline and said helical gear toothed portion thereon in engagement with said quill shaft helical gear, and means for securing said cover to said quill shaft in said position.

12. An electric machine including a stationary member and a rotatable member having a quill shaft mounted in said stationary member, an external driving connector, means secured to said quill shaft for providing a driving connection between said external driving connector and said quill shaft, means including a torsion rod for preloading said driving connection, means for providing a driving connection between said torsion rod and said external connector, and means including a flange on said quill shaft spaced axially away from said external connector having an internal helical gear for torsionally stressing said torsion rod, said torsion stressing means including a spline on the end of said torsion rod adjacent said quill shaft helical gear, a coupling sleeve having a spline thereon complementary to said torsion rod spline and an external helical gear toothed portion thereon complementary to said quill shaft helical gear, means including a flanged cover adapted to be secured to said quill shaft flange in engagement with said coupling sleeve for axially biasing said coupling sleeve to a position with said spline thereon in engagement with said torsion rod spline and said helical gear toothed portion thereon in engagement with said quill shaft helical gear, and means for securing said cover to said quill shaft in said position.

13. A driving arrangement including a rotatable member consisting of or mounted on a quill shaft, means for rotatably supporting said quill shaft, a gear, means including a second gear arranged in engagement with said first-mentioned gear and secured to said quill shaft for providing a driving connection between said first-mentioned gear and said quill shaft, means including a torsion rod extending through said quill shaft for preloading the gear mesh of said first-mentioned and second gears for eliminating backlash therebetween, said pre-loading means including a third gear arranged in driving engagement with said first-mentioned gear and secured to said torsion rod, and means including a helical gear secured to said quill shaft adjacent the end thereof away from said second gear for torsionally stressing said torsion rod, said torsion stressing means including a spline on the end of said torsion rod adjacent said quill shaft helical gear, a coupling sleeve having a spline thereon complementary to said torsion rod spline and a helical gear toothed portion thereon complementary to said quill shaft helical gear, and means adapted to be secured to said quill shaft in engagement with said coupling sleeve for axially biasing said coupling sleeve to a position with said spline thereon in engagement with said torsion rod spline and said helical gear toothed portion thereon in engagement with said quill shaft helical gear providing a twist in said torsion rod by the helical pitch of said helical gears.

14. An electric machine including a stationary member and a rotatable member having a quill shaft mounted in said stationary member, an external driving connector, means secured to said quill shaft for providing a driving connection between said external driving connector and said quill shaft, means including a torsion rod extending through said quill shaft for preloading said driving connection, means for providing a driving connection between said torsion rod and said external connector, means for supporting said torsion rod on said quill shaft, and means including a flange secured to said quill shaft adjacent the end thereof away from said external connector having an internal helical gear thereon for torsionally stressing said torsion rod, said torsion stressing means including a spline on the end of said torsion rod adjacent the end thereof away from said external connector and adjacent said quill shaft helical gear, a coupling sleeve having a spline thereon complementary to said torsion rod spline and an external helical gear toothed portion thereon complementary to said quill shaft helical gear, means including a flanged cover adapted to be secured to said quill shaft flange in engagement with said coupling sleeve for axially biasing said coupling sleeve to a position with said spline thereon in engagement with said torsion rod spline and said helical gear toothed portion thereon in engagement with said quill shaft helical gear, and means for securing said cover to said quill shaft in said position.

15. An electric machine including a stationary member and a rotatable member having a quill shaft mounted in said stationary member, a gear, means including a second gear arranged in engagement with said first-mentioned gear and secured to said quill shaft for providing a driving connection between said first-mentioned gear and said quill shaft, means including a torsion rod extending through said quill shaft for preloading the gear mesh of said first-mentioned and second gears for eliminating backlash therebetween, said preloading means including a third gear arranged in driving engagement with said first-mentioned gear and secured to said torsion rod, means for supporting said torsion rod on said quill shaft, and means including a flange secured to said quill shaft adjacent the end thereof away from said second gear having a helical gear thereon for torsionally stressing said torsion rod, said torsion stressing means including a spline on the end of said torsion rod adjacent the end thereof away from said third gear and adjacent said quill shaft helical gear, a coupling sleeve having a spline thereon complementary to said torsion rod spline and a helical gear toothed portion thereon complementary to said quill shaft helical gear, and means including a flanged cover adapted to be secured to said quill shaft flange in engagement with said coupling sleeve for axially biasing said coupling sleeve to a position with said spline thereon in engagement with said torsion rod spline and said helical gear toothed portion thereon in engagement with said quill shaft helical gear.

16. A driving arrangement including a rotatable member consisting of or mounted on a quill shaft, means for rotatably supporting said quill shaft, an external driving connector, means secured to said quill shaft for providing a driving connection between said external driving connector and said quill shaft, means including a torsion rod extending through said quill shaft for preloading said driving connection, means for providing a driving connection between said torsion rod and said external connector, means for supporting said torsion rod on said quill shaft, and means including a flange secured to said quill shaft adjacent the end thereof away from said external connector having an internal helical gear thereon for torsionally stressing said torsion rod, said torsion stressing means including a spline on the end of said torsion rod adjacent the end thereof away from said external connector and adjacent said quill shaft helical gear, a coupling sleeve having a spline thereon complementary to said torsion rod spline and an external helical gear toothed portion thereon complementary to said quill shaft helical gear, means including a flanged cover adapted to be secured to said quill shaft flange in engagement with said coupling sleeve for axially biasing said coupling sleeve to a position with said spline thereon in engagement with said torsion rod spline and said helical gear portion thereon in engagement with said quill shaft helical gear providing a twist in said torsion rod by the helical pitch of said helical gears, and means for securing said cover to said quill shaft in said position.

17. A driving arrangement including a rotatable member consisting of or mounted on a quill shaft, means for rotatably supporting said quill shaft, a gear, means including a second gear arranged in engagement with said first-mentioned gear and secured to said quill shaft for providing a driving connection between said first-mentioned gear and said quill shaft, means including a torsion rod extending through said quill shaft for preloading the gear mesh of said first-mentioned and second gears for eliminating backlash therebetween, said pre-loading means including a third gear arranged in driving engagement with said first-mentioned gear and secured to said torsion rod, means for supporting said torsion rod on said quill shaft, and means including a flange secured to said quill shaft adjacent the end thereof away from said second gear having an internal helical gear thereon for torsionally stressing said torsion rod, said torsion stressing means including a spline on the end of said torsion rod adjacent the end thereof away from said third gear and adjacent said quill shaft helical gear, a coupling sleeve having a spline thereon complementary to said torsion rod spline and an external helical gear toothed portion thereon complementary to said quill shaft helical gear, means including a flanged cover adapted to be secured to said quill shaft flange in engagement with said coupling sleeve for biasing said coupling sleeve to a position with said spline thereon in engagement with said torsion rod spline and said helical gear portion thereon in engagement with said quill shaft helical gear, and means for securing said cover to said quill shaft in said position.

18. An electric machine including a stationary member and a rotatable member having a quill shaft mounted in said stationary member, a gear, means including a second gear arranged in engagement with said first-mentioned gear and secured to said quill shaft for providing a driving connection between said first-mentioned gear and said quill shaft, means including a torsion rod extending through said quill shaft for preloading the gear mesh of said first-mentioned and second gears for eliminating backlash therebetween, said preloading means including a third gear arranged in driving engagement with said first-mentioned gear and secured to said torsion rod, means for supporting said torsion rod through said third gear on said quill shaft through said second gear, and means including a flange secured to said quill shaft adjacent the end thereof away from said second gear having an internal helical gear thereon for torsionally stressing said torsion rod, said torsion stressing means including a spline on the end of said torsion rod adjacent the end thereof away from said third gear and adjacent said quill shaft helical gear, a coupling sleeve having a spline thereon complementary to said torsion rod spline and an external helical gear toothed portion thereon complementary to said quill shaft helical gear, means including a flanged cover adapted to be secured to said quill shaft flange in engagement with said coupling sleeve for axially biasing said coupling sleeve to a position with said spline thereon in engagement with said torsion rod spline and said helical gear toothed portion thereon in engagement with said quill shaft helical gear, and means for securing said cover to said quill shaft in said position.

JAMES D. McDONALD.

REFERENCES CITED

The following references are of record in the file of this patent:

UNITED STATES PATENTS

| Number | Name | Date |
|---|---|---|
| 2,163,836 | Haas | June 27, 1939 |

FOREIGN PATENTS

| Number | Country | Date |
|---|---|---|
| 596,082 | Germany | Apr. 26, 1934 |